Dec. 31, 1968    E. R. TAGGART    3,419,067
FLUID CARRYING CONDUIT INSULATOR
Original Filed Nov. 5, 1965    Sheet 1 of 2
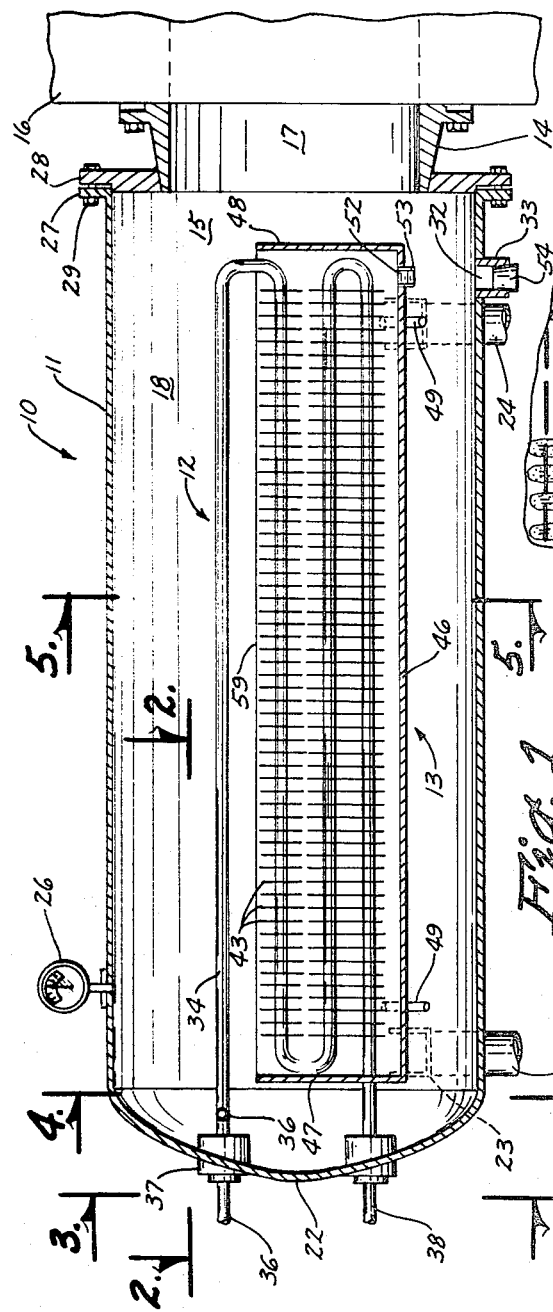
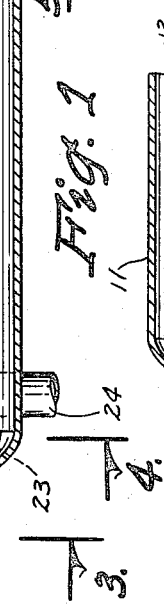
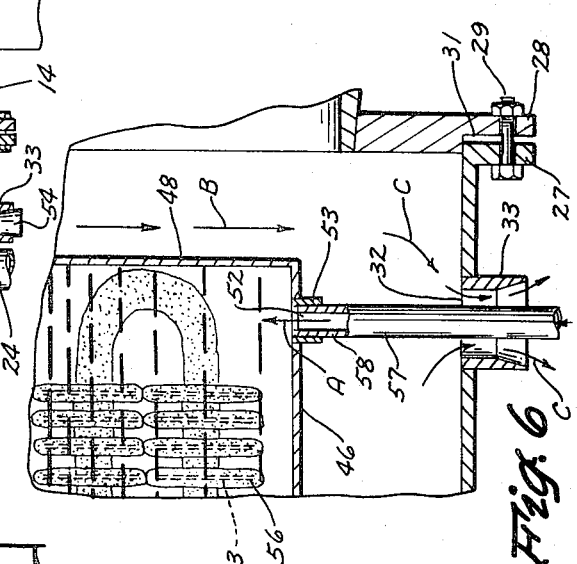
INVENTOR
EVERETT R. TAGGART
BY
Robert Henderson
ATTORNEY Dec. 31, 1968   E. R. TAGGART   3,419,067
FLUID CARRYING CONDUIT INSULATOR
Original Filed Nov. 5, 1965   Sheet 2 of 2
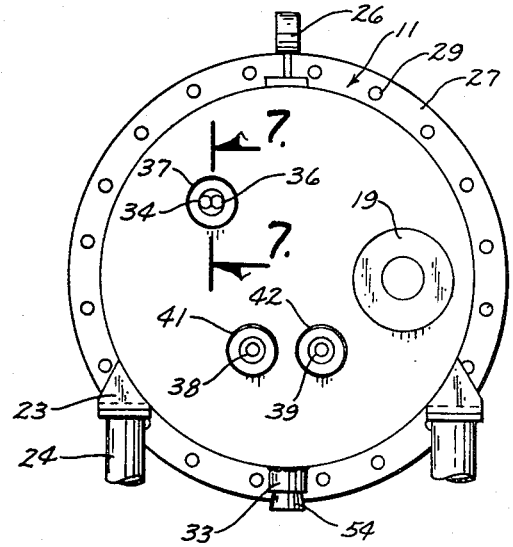
Fig. 3
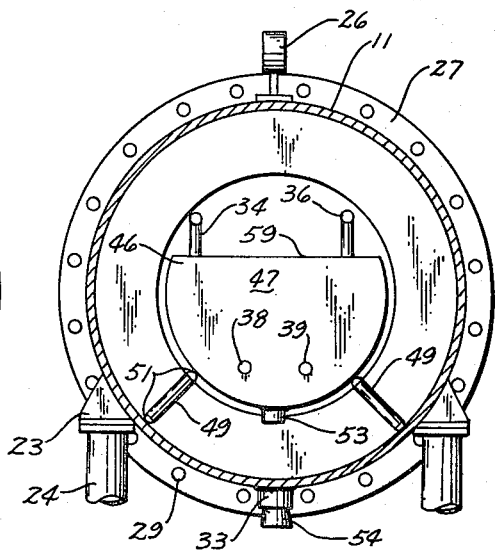
Fig. 4
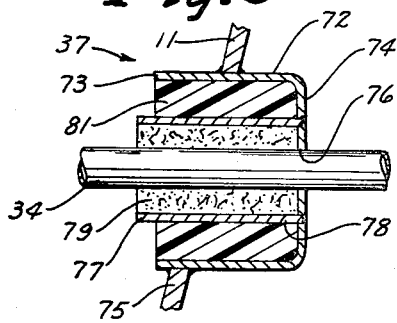
Fig. 7
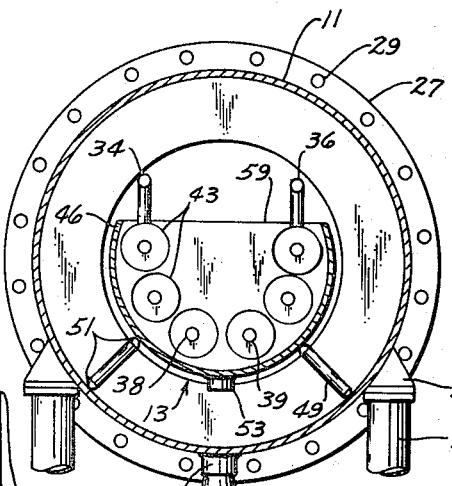
Fig. 5
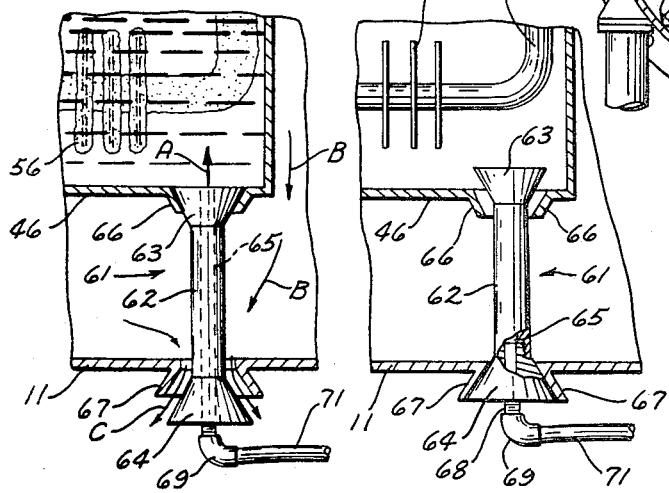
Fig. 8   Fig. 9
INVENTOR
EVERETT R. TAGGART
BY
ATTORNEY

United States Patent Office 3,419,067
Patented Dec. 31, 1968

3,419,067
FLUID CARRYING CONDUIT INSULATOR
Everett R. Taggart, 5176 SE. 40th St.,
Des Moines, Iowa 50320
Original application Nov. 5, 1965, Ser. No. 506,522, now Patent No. 3,339,376, dated Sept. 5, 1967. Divided and this application Aug. 31, 1967, Ser. No. 674,688
1 Claim. (Cl. 165—47)

ABSTRACT OF THE DISCLOSURE

This invention relates to a condenser apparatus, the improvement going to effectively insulating one or more refrigerant-carrying conduits from the externally exposed walls of a condenser apparatus. The insulation is accomplished by embracing each conduit at its point of passage through a wall with first a packing material, and second a Styrofoam-type material, each annular blanket of material being separated from the other and from the wall by a solid tubular element.

Background of the invention

This invention relates to an improvement in the art of eliminating the transfer of heat from a fluid carrying conduit or pipe to a wall which it passes through.

In the usual condenser, a serious loss of heat or cooling effectiveness is had due to a high heat-transfer between the fluid carrying conduits or the shell or outer exposed wall of the condenser. An additional disadvantage particularly in refrigerant carrying apparatus is the frosting over of the conduits due to said heat loss.

Applicant's knowledge of the prior art is such that the provision of no arrangement comparable to the one disclosed herein is known.

Summary of the invention

This invention comprises the complete separation of a refrigerant carrying conduit from the exterior wall of a condenser through which the conduit passes; such separation being accomplished by separate layers of packing and Styrofoam-like material, which layers are annular in shape and are in themselves separated.

This is a divisional application of my copending application Ser. No. 506,522 filed Nov. 5, 1965, now Patent No. 3,339,376, patented Sept. 5, 1967 and entitled Condenser Apparatus and Method of Defrosting.

It is an object of this invention to provide an improved refrigerant carrying pipe sealing structure for the condenser described hereinafter.

It is another object of this invention to provide an arrangement for effectively insulating the refrigerant-carrying conduits from the externally exposed condenser walls.

Brief description of the drawing

FIG. 1 is a vertical sectional view along the longitudinal axis of the condenser of this invention;

FIG. 2 is a fragmentary, horizontal sectional view taken along the line 2—2 in FIG. 1;

FIG. 3 is an end elevational view taken along the line 3—3 in FIG. 1;

FIG. 4 is a vertical sectional view taken along the line 4—4 in FIG. 1;

FIG. 5 is a vertical sectional view taken along the line 5—5 in FIG. 1;

FIG. 6 is an enlarged, fragmentary view of a detail of FIG. 1, wherein frost has formed on the condenser coils;

FIG. 7 is an enlarged, fragmentary view of a detail of FIG. 1;

FIG. 8 is an enlarged, fragmentary view of a modified structure relative to FIG. 6; and FIG. 9 is a view similar to FIG. 8, with an alternate position illustrated.

Description of the preferred embodiment

Referring now to the drawings, the condenser of this invention is indicated generally at 10 in FIG. 1 and comprises basically a cylindrical housing 11 enclosing an evaporator unit 12, the latter substantially enclosed by a trough unit 13.

The condenser 10 is mounted at an open end 15 thereof by a mounting bracket 14 to a wall 16, the latter having an enclosure (not shown). The function of the condenser 10 is to withdraw water vapor from the air within the enclosure and the housing 11. The air is withdrawn from said enclosure and housing, by means of suction, through the bracket opening 17 and into the chamber 18 (FIG. 1) of the housing 11, then drawn through an outlet 19 (FIG. 2) and conduit 21 to a vacuum pump arrangement (not shown).

The housing 11 includes the cylindrical wall having an outer closed end 22 (FIG. 1) within which are formed several openings described more in detail hereinafter. The housing 11 is mounted on a quartet of support brackets 23 (FIG. 3) which are in turn supported by upstanding legs 24 supported on a generally horizontal surface (not shown).

On top of the housing wall 11, a vacuum gauge 26 (FIG. 1) is provided in fluid communication with the interior of the chamber 18 for indicating the vacuum therein at any instant. At the inner open end 15 of the housing 11, a flange 27 is secured to a flange 28 formed as a part of the mounting bracket 14, by a plurality of fastening devices 29. An annular gasket 31 (FIG. 6) is secured between the flanges 27 and 28 for providing a fluid tight seal therebetween. Referring particularly to FIG. 6, a fluid transmitting passage 32 is formed in a lowermost portion of the housing 11 directly below the trough unit 13. The passage 32 is formed by a circular, short length of pipe 33 secured, as by welding, to the housing 11.

The evaporator unit 12 comprises a pair of conduits 34 and 36 (FIGS. 1 and 3), which carry a liquid refrigerant therein. These conduits enter the housing chamber 18 together from without through an insulator device 37 (FIG. 3). Inside the chamber 18, the conduits 34 and 36 diverge and extend generally horizontally in a parallel manner (see FIG. 4) to the rear of the trough unit 13, at which point both conduits depend into the interior of the trough unit. From that point, both conduits 34 and 36 have a serpentine-coil configuration best illustrated in FIGS. 1 and 5.

The discharge ends 38 and 39 (FIGS. 1 and 5) of the refrigerant carrying conduits 34 and 36 leave the trough unit 13 through a wall thereof, described hereinafter, and leave the closed end 22 of the housing 11 through another pair of insulator devices 41 and 42. Within the trough unit 13, both conduits 34 and 36 have a plurality of conventional, circular fins 43 secured thereto in spaced relation for providing a maximum amount of surface for condensing purposes.

The trough unit 13 of the condenser 10 comprises an actual trough 46 having a semi-circular form in cross-section (FIG. 5), with the top thereof open. Both ends 47 and 48 (FIG. 1) of the trough 46 are closed, except that the outer end 48 has a pair of openings (not shown) formed therein through which the discharge ends 38 and 39 extend in a fluid tight manner.

The trough 46 is mounted upon a quartet of legs 49 which support the trough 46 upon the inner wall surfaces of the housing 11 in a position where the trough is concentrically located within the interior of the cylindrical housing 11. This is best illustrated in FIGS. 4 and 5.

All legs 49 are insulated with both ends 51 thereof in engagement with the trough 46 and the housing 11 formed of plastic or the like. A fluid discharge port 52 (FIGS. 1 and 6) is formed in the lowermost portion of the trough 46 at an inner end thereof, with the passage formed by a short length of internally threaded pipe 53. The port 52 is directly over the passage 32 of the cylinder 11, and is vertically axially aligned therewith for a purpose hereinafter described.

In normal operation of the condenser 10, with a plug 54 (FIG. 1) closing the lower passage 32, the transmission of a refrigerant, such as liquid Refrigerant R–12, through the conduits 34 and 36 eventually causes ice and frost (FIG. 6) to form on the coils 34 and 36 and the fins 43.

To effect a defrosting of this condensate 56 in its crystallized form, the following process is performed. A length of pipe 57, designated hereinafter as a nozzle, having a diameter less than the internal diameter of the pipe 33 (FIG. 6), with its upper end 58 externally threaded, is threadably inserted into the port pipe 43 of the trough 46 as best illustrated in FIG. 6. At this time there is no vacuum within the condenser 10 and the refrigerant lines 34 and 36 have been vacated of their refrigerant, with the usual compressor (not shown) connected with such equipment stopped from operation.

A fluid, such as normal tap water, brine, or the like is forced through the nozzle 57 upwardly into the trough 46 as indicated by the arrow A in FIG. 6. As the trough 46 fills with the water, the evaporator unit 12 therewithin is completely submerged, the finned coils thus being completely covered with water substantially simultaneously. The ice and frost 56 is thereby melted with the latter adding merely to the quantity of water.

As the water continues to flow into and upwardly within the trough 46, it eventually spills over the upper edge 59 of the trough, which edge extends completely about and above the serpentine, finned portions of the conduits 34 and 36. The overflowing water then runs down the sides of the trough 46, running into the bottom portion of the housing 11 and collecting there. Referring to FIG. 6, the arrows B indicate the overflowing water, with the arrows C showing the path of discharge of the overflowed water, said discharge being through the passage 32 and about the nozzle 57. From the passage 32, the discharged fluid is transmitted to a drain or the like.

The continual flow of the fluid upwardly through the nozzle 57 and upwardly within the trough 46 continues for a predetermined period of time so as to melt and dislodge all frost and ice 56 formed on the evaporator unit 12. This can readily be ascertained through a glass window or the like supported in the housing end 22.

The fluid being discharged through the nozzle 57 is then stopped, when the ice 56 has melted, and the nozzle 57 is then removed from the pipe 53. All of the water within the housing 11 which had overflowed the trough 46 will have drained through the lower passage 32. By removing the nozzle 57 from the trough 46, the port 52 is automatically opened for draining the water from within the trough 46 downwardly through the passage 32 and toward the drain provided therefor.

It can therefore be readily envisaged that a complete and positive defrosting of the evaporator unit 12 occurs due to a complete submerging of the evaporator coils and fins of the unit 12 by virtue of filling the trough 46 with a body of the supplementary-heat fluid, and maintaining a flow of the fluid within the trough 46 such as to overflow said trough for a predetermined period of time. The location of the passage 32 and the port 52 are such as to provide an extremely practical and economical method of introducing the defrosting fluid into the trough while permitting the overflow caught by the housing 11 to pass through the lower passage. The same path of introducing the water is therefore used as a drain path.

Referring particularly to FIGS. 8 and 9, a modified nozzle arrangement is illustrated with all other elements identical to the structure of FIGS. 1–7 indicated by like reference numerals. The modified nozzle 61 comprises a closure member 62 with a pair of oppositely flared ends 63 and 64 having a complementary fit with the trough port 66 and the housing passage 67. It will be noted that the latter openings are again vertically aligned, but are themselves oppositely flared to snugly accept the nozzle ends.

The length of the member 62 is such that with the upper end 63 closing the port 66 from the passage of fluid therethrough, the lower end 64 is spaced from the passage 67 (FIG. 8). In FIG. 9 the opposite condition is illustrated; and the member 62 has an intermediate position where neither opening is closed. To supply water or the like to the trough 46, a pipe 68 (FIG. 8) is provided, having an elbow 69 connecting its outer end to the flexible conduit 71 leading to a source of water. The pipe 68 (FIG. 9) is inserted through the end 64 for threaded insertion into the member 62, the latter having a passage 65 formed therethrough for transmitting the water.

The defrosting operation utilizing the nozzle 61 is substantially the same as the FIGS. 1–7 nozzle 57. With the nozzle 61 in the position of FIG. 8, water is forced through the pipe 68 into the trough 46, as indicated by the arrow A. When the trough 46, with the port 66 closed, overflows, with the frost and ice 56 melting, the water flows over the sides of the trough (see arrows B, FIG. 8) and then flows out the passage 67 as indicated by the arrows C for further transmission to a drain or the like.

When it is desired to drain the trough 46, the nozzle 61 is raised, by any conventional means, to a position intermediate that of FIGS. 8 and 9, such that both the port 66 and the passage 67 are open. Then, when the trough 46 is completely emptied of the fluid, the nozzle 61 is raised to the FIG. 9 position, closing the passage 67 and thus permitting a vacuum to be obtained within the chamber 18.

Referring now to FIG. 7, the insulator device 37 is illustrated in detail. This device 37 is identical to insulator devices 41 and 42. It comprises a circular member 72 having an open end 73 exposed beyond the housing 11, and an inner end which is closed by a plate 74. The member 72 is secured as by welding to the opening 75 provided therefor within the housing 11. The securement provides a fluid-tight arrangement. Within the plate 74, an opening 76 is formed centrally thereof through which the conduit 34 passes. This passage also is of a fluid-tight nature.

Another cylindrical element 77 is provided which surrounds the conduit 34, and the inner end 78 of which abuts the outer side of the plate 74 and is secured thereto in a concentric manner relative to the conduit 34 and to the member 72. By this arrangement, a pair of annular cavities are formed, one between the element 77 and the conduit 34, and the other between the element 77 and the member 72.

To completely insulate the conduit 34 from the housing 11, packing 79 is placed within the inner cavity, and Styrofoam 81 or the like is placed within the outer cavity, as illustrated in FIG. 7. By this arrangement, during operation of the conduit 10 and the unit associated therewith, absolutely no frost or the like is formed about the conduit 34 and the housing 11 associated therewith. This is also true with respect to the discharge conduits 38 and 39 (FIG. 3) due to their insertion through the insulator devices 41 and 42.

Although a preferred embodiment of the invention, with a modification thereof has been described and disclosed hereinbefore, modifications and alterations can be made thereto without departing from the true spirit and scope of the invention as defined in the appended claim.

I claim:

1. In a condenser apparatus having a chamber enclosed by a wall, the chamber enclosing refrigerant transmitting tubes which enter and leave the chamber through the wall, means for insulating each tube from the wall comprising:

the wall having an opening formed therein for each tube;

a first hollow member open at one end and closed at the other end inserted in said opening and secured in a fluid tight manner about its exterior surface to said wall, with said closed end extended within the chamber and having an aperture formed centrally therein for receiving a tube, said tube having a fluid-tight fit within said aperture;

a second hollow member open at both ends inserted concentrically within said first member and surrounding said tube whereby to form a pair of annular cavities about said tube and within said first member, the inner end of said second member abutting and secured to said closed end;

first insulation means inserted into said annular cavity formed between said tube and said second member; and second insulation means inserted into said annular cavity formed between said second member and said first member.

References Cited

UNITED STATES PATENTS

| | | | |
|---|---|---|---|
| 1,829,748 | 11/1931 | Hofferberth | 285—47 |
| 1,987,934 | 1/1935 | Harrison et al. | 165—135 X |
| 2,663,580 | 12/1953 | Shirk | 285—47 X |

ROBERT A. O'LEARY, *Primary Examiner.*

A. W. DAVIS, JR., *Assistant Examiner.*

U.S. Cl. X.R.

165—135; 277—12; 285—47